(12) United States Patent
Chang

(10) Patent No.: US 7,278,774 B2
(45) Date of Patent: Oct. 9, 2007

(54) LIGHT-CONDUCTIVE PANEL OF SIDE-LIGHT TYPE BACKLIGHT MODULE

(75) Inventor: Chia-Yin Chang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 17 days.

(21) Appl. No.: 11/240,503

(22) Filed: Oct. 3, 2005

(65) Prior Publication Data

US 2007/0076435 A1    Apr. 5, 2007

(51) Int. Cl.
*F21V 7/04* (2006.01)

(52) U.S. Cl. .................. 362/626; 362/625; 349/65; 385/901

(58) Field of Classification Search .............. 362/625, 362/626; 349/65; 385/901
See application file for complete search history.

(56) References Cited

U.S. PATENT DOCUMENTS 6,576,887 B2 *   6/2003   Watson et al. .............. 385/901

* cited by examiner

*Primary Examiner*—Stephen F. Husar
(74) *Attorney, Agent, or Firm*—Leong C. Lei

(57) ABSTRACT

A light-conductive panel of side-light type backlight module is disclosed. The reflective plane of the light-conductive panel is formed with a plurality of light conductors, and one lateral side of the conductor is formed with an auxiliary light conductor which is formed along the light conductor. The leak light source which can be led into the light-conductive panel from the light conductor can be connected by the matching auxiliary light conductor such that the leaked light source can be further led to the interior of the light conductive panel so that the chance of the leaked light source on the reflective plate is reduced, which will reduce the light energy exhaustion caused by the light source being fallen onto the reflective plate.

9 Claims, 7 Drawing Sheets

LIGHT-CONDUCTIVE PANEL OF SIDE-LIGHT TYPE BACKLIGHT MODULE

BACKGROUND OF THE INVENTION

1. (a) Technical Field of the Invention

The present invention relates to light-conductive panel of side-light type backlight module, and in particular, to a light-conductive panel which can reduce the chance of light source being emitted onto the reflective sheet, and therefore the light energy exhaustion as a result of light source being emitted onto the reflective sheet is reduced. Accordingly, the hue of the emitted light of the light conductive panel is enhanced.

2. (b) Description of the Prior Art

In a backlight module, light-conductive panel elements are greatly depended on in order to provide a plane-like light source.

Generally, light conductive panels have excellent light transitivity, and optical class of acrylic material, such as PMMA, is widely used to fabricate light-conductive panels to form a light emitting plane, a reflective plane, and at least an incident light plane. Conventionally, the surface of the reflective plane is formed into patterns to be used as light source reflective conductive light, and recently, a new light source reflective conductive light is designed.

Conventional light conductive panel includes a light-emitting plane 11, a reflective plane 12 which is located correspondingly to the light emitting plane 11, and at least an incident light plane 13 at one lateral side connecting to the light emitting plane 11 and the light reflective plane 12. The reflective plane 12 has a plurality of light conductors 121 which has a V-shaped cross section. As shown in FIG. 1, the light conductor 121 is protruded out from the reflective plane 12, or as shown in FIG. 2, the light conductor 121 is formed as recess within the reflective plane 12. When the light source from a lamp source 2 enters the interior of the light conductive panel 1 via the incident light plane 13, only a partial source passes through the reflective plane 12 and the light conductor 12 changes the light source progressing direction and the light source is again led to the light conductive panel 1. This will reduce the chance of the light source being emitted onto the reflective sheet 3, i.e., the exhaustion of light source as a result of reflection by the reflective sheet 3 is reduced.

However, the formation of the light conductor 121 on the reflective plane 12 of the light conductive panel 1 is better than the conventional reflective pattern formed on the reflective plane of the light conductive panel with respect to fabrication process and the reflective effect of the light source, in practice, the performance still needs improvement. The reason for this is that as shown in FIGS. 3 and 4, when the light source is emitted onto the light conductor 121, only a partial light source is refracted and reflected by the light conductor 121. In a reality, when the light source passes through the light conductor 121, the light source passes through the first sloping face 1211 of the light conductor 121 and is refracted to the second sloping face 1212, and a partial of the light source is reflected to the light conductive panel via the second sloping face 1212, and a partial of the light source will pass through the second sloping face 1212 and emit onto the reflective sheet 3, which has to be reflected by the reflective sheet 3 so as to further reflect to the light conductive panel 1. Thus, the light source will exhaust some of the energy during reflection onto the reflective sheet 3. Accordingly, it is an object of the present invention to provide a light-conductive panel of side-light type backlight module which mitigates the drawbacks.

SUMMARY OF THE INVENTION

The primary purpose of the present invention is to provide a light-conductive panel of a lateral-light type backlight module having a light-emitting plane, a reflective plane positioned that corresponds to the light-emitting plane, and at least one incident-light plane connected to the light-emitting plane and the reflective plane and the reflective plane being provided with a plurality of light conductors in parallel to the direction of the incident-light plane, characterized in that one lateral side of the light conductor is formed into an auxiliary light conductor, protruded out of the reflective plane and having a first light sloping face and a second light sloping face; and the auxiliary light conductor is positioned along the light conductors.

Yet another object of the present invention is to provide a light-conductive panel of side-light type backlight module, wherein the material of the light-conductive panel is made from excellent light transitive material such as optical class acrylic, PMMA. The light conductive panel minimizes the chance of the light source being emitted onto the reflective sheet which reduces the exhaustion of light energy. This will enhance the hue of the light conductive panel.

A further object of the present invention is to provide a light-conductive panel of a side-light type backlight module, wherein the length of the auxiliary light conductor protruded at the reflective plane is longer than that of the matching light conductor protruded at the reflective plane.

Yet still another object of the present invention is to provide a light-conductive panel of a side-light type backlight module, wherein the second light sloping face of the auxiliary light conductor is of recessed and curved shape.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
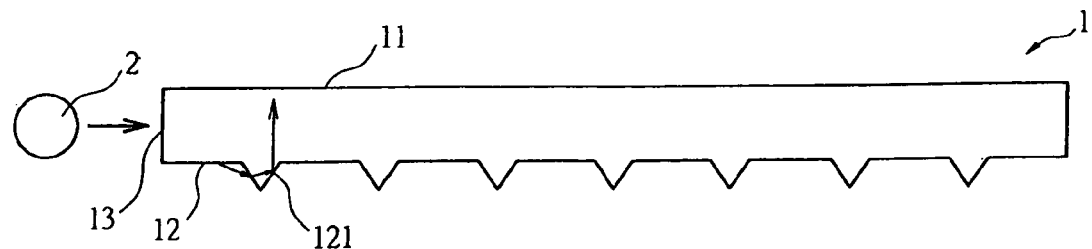
FIG. 1 is a schematic view showing a conventional light conductive panel of a back light module.
Figure 2:
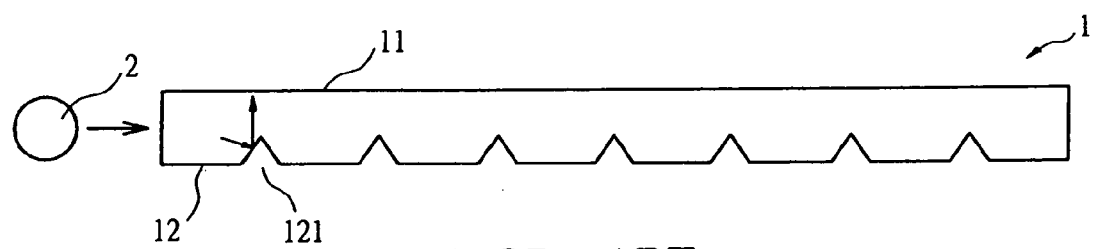
FIG. 2 is a schematic view showing the light conductive panel of another conventional back light module.
Figure 3:
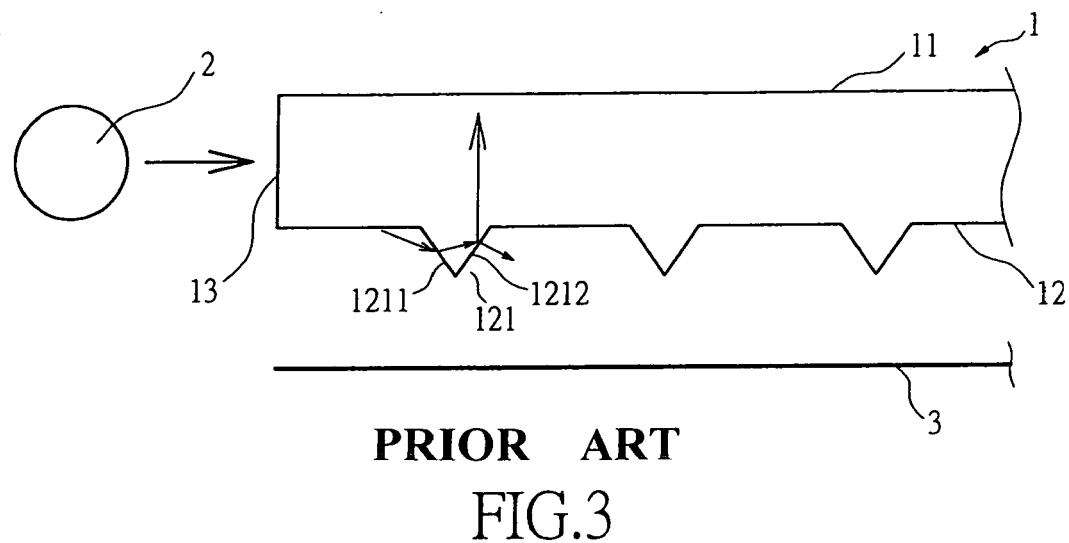
FIG. 3 is a schematic view showing light source movement of FIG. 1.
Figure 4:
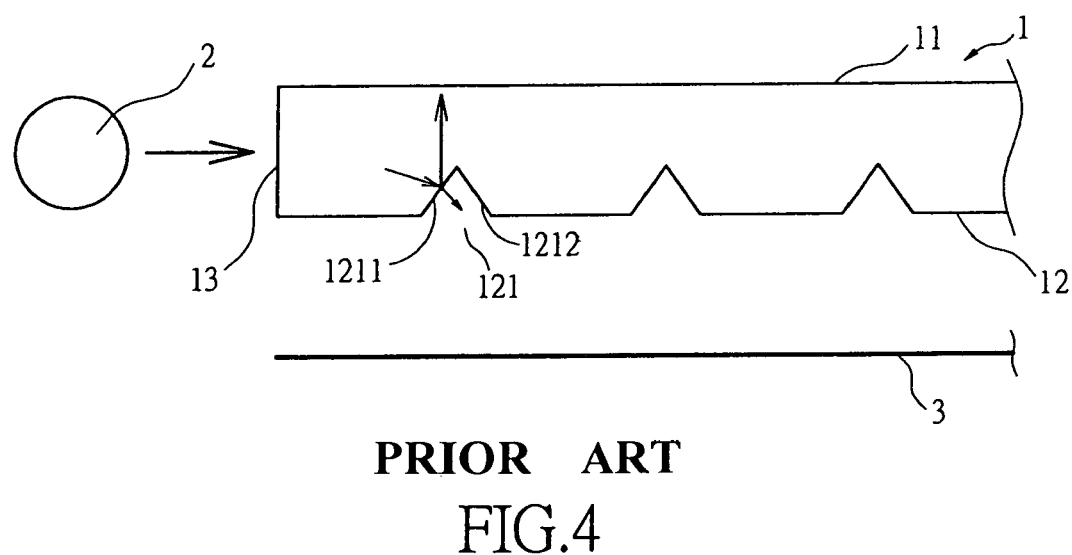
FIG. 4 is a schematic view showing light source movement of FIG. 2.
Figure 5:
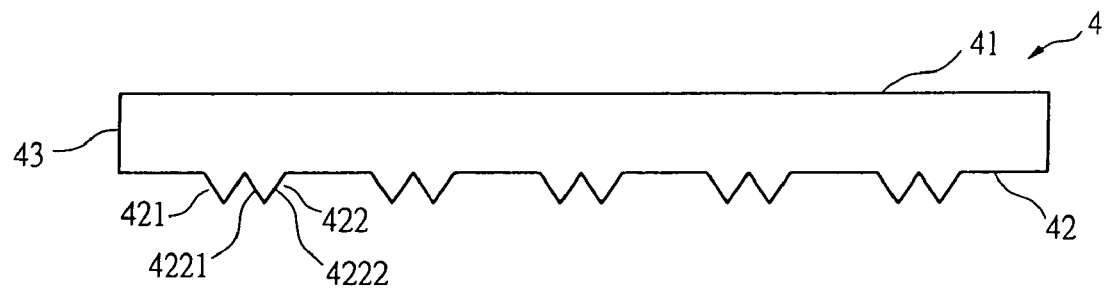
FIG. 5 is a sectional view of the light conductive panel of the present invention.

Referring to FIG. 5, there is shown a light conductive panel of a side light type backlight module. The light conductive panel 4 is made from good light transitive material and has a light-emitting plane 41, a reflective plane 42 corresponding to the light-emitting plane 41, and at least an incident-light plane 43 connected to the light-emitting plane 41 and the reflective plane 42, and the reflective plane 42 is formed with a plurality of light conductors 421 protruded out from the reflective plane 42. The light conductor 421 is formed in parallel with the direction of the incident light plane 41, and one side of the light conductor 421 (at the distant side of the incident light plane) is formed into auxiliary light conductor 422, and the auxiliary light conductor 422 includes a first light sloping face 4221 and a second light sloping face 4222 and is formed along the light conductor 421.

Figure 6:
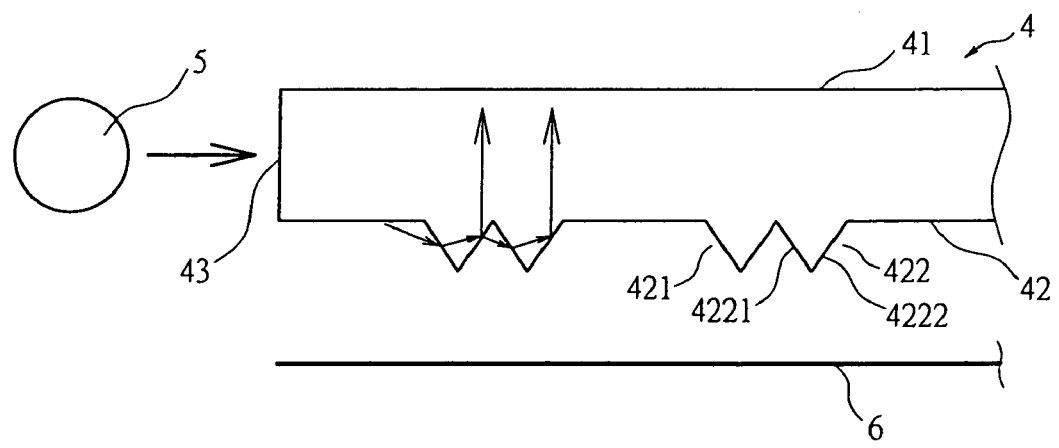
FIG. 6 is a schematic view of the light source movement of FIG. 5 of the present invention.

As shown in FIG. 6, when the incident-light plane 43 receives the light source of the lamp source 5, the light source is transmitted into the interior of the light conductive panel 4, wherein a portion of the light source reflected into the light conductor 421 via the reflective plane 42 is refracted and reflected by the light conductor 421 and the light source is transmitted at the direction of the light emitting plane 41 and will not smoothly reflective back the light source to the interior of the light conductive panel 4 from the light conductor 421. Thus, the light source passed through the light conductor 421 will be received by the auxiliary light conductor 421 at one side of the light conductor 421, and is refracted by the first sloping face 4221 and the light source after refraction is led to the second sloping face 4222. The second sloping face 4222 further reflects the light source to the conductive panel 4, and the light source is directed to the light-emitting plane 41 of the light-conductive panel 4.

In accordance with the present invention, one lateral side of the light conductor 421 of the reflective plane 42 is formed into an auxiliary light conductor 422 which can lead the leaked light source from the light conductor 421 by the auxiliary light conductor 422 to the light-conductive panel 4 such that the light source leaked from the light conductor 421 will not be emitted onto the reflective sheet 6, i.e., the energy exhaustion as a result of frequent reflections by the reflective sheet 6 will be reduced, and therefore, the hue of the light-conductive panel 4 is enhanced.

Figure 7:
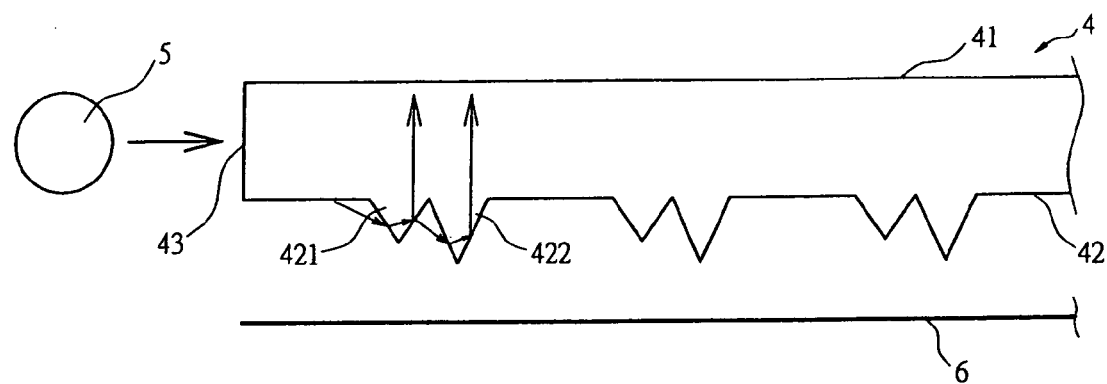
FIG. 7 is a schematic view of the auxiliary light conductor in accordance with a preferred embodiment of the present invention.

As shown in FIG. 7, when the present invention is implemented, the length of the auxiliary light conductor 423 protruded from the reflective plane 42 of the light conductive panel 4 is greater than the length of the matching light conductor 4221. This will effectively and fully receive the light source leaked from the light conductor 421 and the auxiliary light conductor 422 leads the light source.

Figure 8:
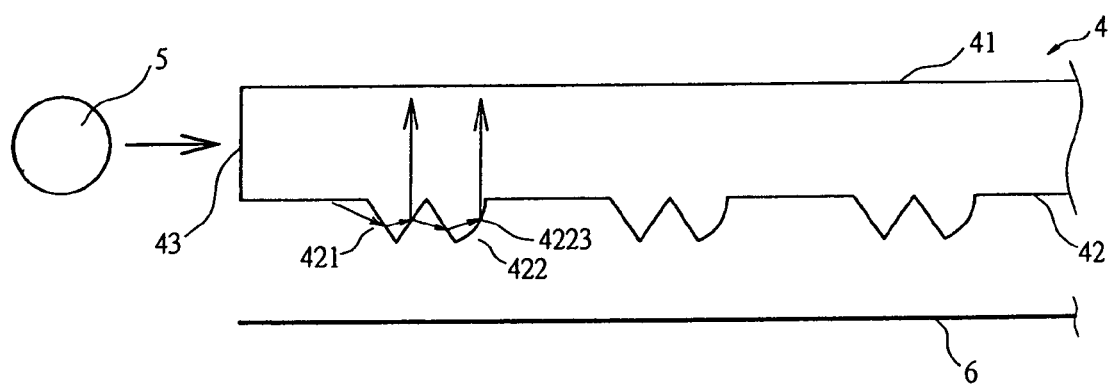
FIG. 8 is a schematic view of the auxiliary light conductor in accordance with another preferred embodiment of the present invention.

As shown in FIG. 8, the second sloping face 4222 of the auxiliary light conductor 423 is formed into a recessed and curved shape face 4223, and the light source refracted via the first sloping face 4221 which is to be reflected, the recessed and curved face 4223 is provided with focusing and reflection, such that when the light source reflected to the light conductive panel 4 has a focusing effect, and thus the performance of hue is enhanced.

Figure 9:
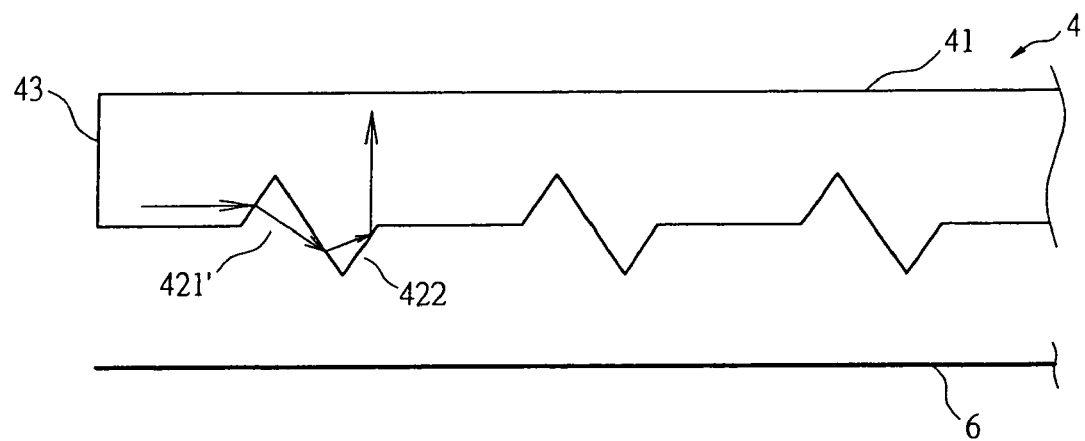
FIG. 9 is a schematic sectional view showing the recessed light conductor in combination with the present invention.

In view of the formation of the auxiliary light conductor 422 and the function of the light source, the light conductor 421 of the reflective plane 42 is recessed onto the recessed shape light conductor 421' of the reflective plane 4, and one lateral side of the recessed light conductor 421' has an auxiliary light conductor 422. As shown in FIG. 9, the auxiliary light conductor 422 is formed at one lateral side of the recessed light conductor 421', such that the partial light source that has not smoothly led by the recessed light conductor 421' to the light conductive panel 4 will further lead to the conductive panel 4 by the auxiliary light conductor 422. This can effectively reduce the chance of the light source from emitted on the reflective panel 6 and therefore the light energy exhaustion as a result of reflection action of the reflective sheet 6 is greatly reduced.

Figure 10:
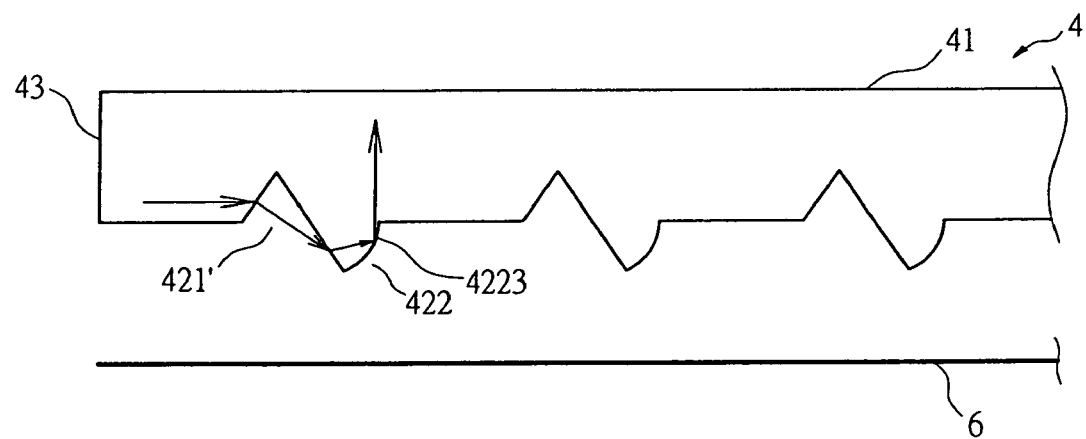
FIG. 10 is another schematic sectional view showing the recessed light conductor in combination with the present invention.
Figure 11:
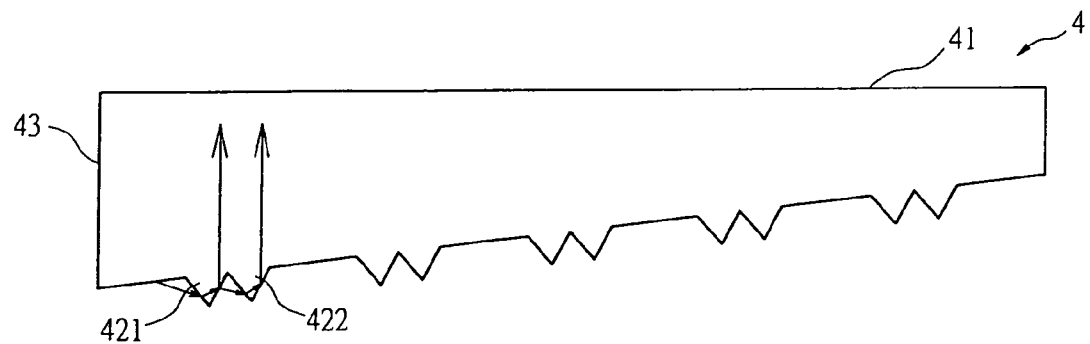
FIGS. 11 to 14 respectively show the sectional views of the present invention being applied to the wedge-type light conductive panel.
Figure 12:
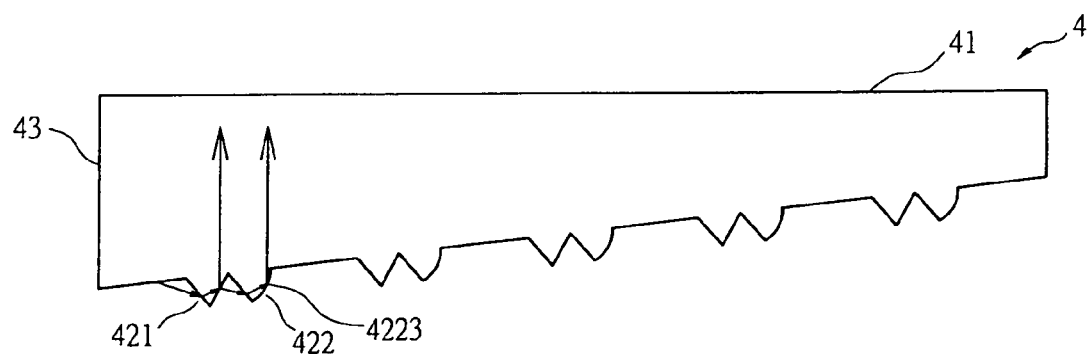
Figure 13:
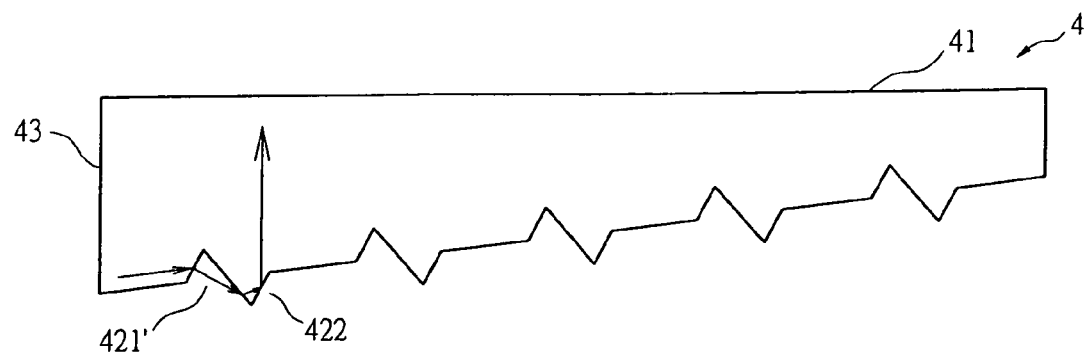
Figure 14:
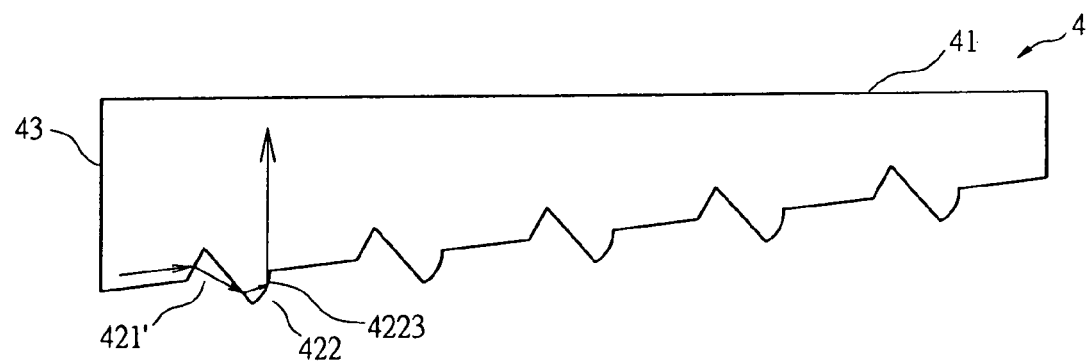

As shown in FIG. 10, when the light conductive panel 4 has a recessed light conductor 421', the auxiliary light conductor 422 can also has a recessed and curved face 4223 to combine with when in application. This will cause the light source via the recessed and curved plane 4223 to provide light to focus and reflect. This will achieve the object of leading of the focused light.

In accordance with the present invention, the shape of the light conductive panel 4 is not restricted to planar shape, other shapes such as wedge shape is also applicable. This will not affect the application of the present invention and the leading of light and the effect thereof are similar to the above-mentioned, as shown in FIGS. 10 to 14.

In view of the above, the reflective plane of the light conductive panel is provided with a plurality of auxiliary light conductors, and one lateral side of the conductor is formed with an auxiliary light conductor which is formed along the light conductor. The leak light source which can be led into the light-conductive panel from the light conductor can be connected by the matching auxiliary light conductor such that the leaked light source can be further led to the interior of the light conductive panel so that the chance of the leaked light source on the reflective plate is reduced, which will reduce the light energy exhaustion caused by the light source being fallen onto the reflective plate.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A light-conductive panel of a lateral-light type backlight module having a light-emitting plane, a reflective plane positioned corresponding to the light-emitting plane, and at least one incident-light plane connected to the light-emitting plane and the reflective plane and the reflective plane being provided with a plurality of light conductors in parallel to the direction of the incident-light plane, characterized in that one lateral side of the light conductor is formed into an auxiliary light conductor, protruded out of the reflective plane and having a first light sloping face and a second light sloping face; and the auxiliary light conductor is positioned along the light conductors, wherein the length of the auxiliary light conductor protruded at the reflective plane is longer than that of the matching light conductor protruded at the reflective plane.

2. The light-conductive panel of claim 1, wherein the second light sloping face of the auxiliary light conductor is of recessed and curved shape.

3. The light-conductive panel of claim 2, wherein the light conductor which in combination with the auxiliary light conductor is recessed within the recess of the light conductor of the reflective plane.

4. The light-conductive panel as claimed in claim 1, wherein the light conductive panel is a flat body.

5. The light-conductive panel as claimed in claim 2, wherein the light conductive panel is a flat body.

6. The light-conductive panel as claimed in claim 3, wherein the light conductive panel is a flat body.

7. The light-conductive panel as claimed in claim 1, wherein the light conductive panel is a wedge-like body.

8. The light-conductive panel as claimed in claim 2, wherein the light conductive panel is a wedge-like body.

9. The light-conductive panel as claimed in claim 2, wherein the light conductive panel is a wedge-like body.

* * * * *